(12) United States Patent
Kakiuchi

(10) Patent No.: US 7,525,573 B2
(45) Date of Patent: Apr. 28, 2009

(54) CAMERA PROVIDED WITH TREMBLE CORRECTING FUNCTION

(75) Inventor: Shinichi Kakiuchi, Saitama (JP)

(73) Assignee: Hoya Corporation, Tokyo (JP)

( * ) Notice: Subject to any disclaimer, the term of this patent is extended or adjusted under 35 U.S.C. 154(b) by 634 days.

(21) Appl. No.: 11/087,605

(22) Filed: Mar. 24, 2005

(65) Prior Publication Data
US 2005/0212917 A1 Sep. 29, 2005

(30) Foreign Application Priority Data
Mar. 29, 2004 (JP) .......................... P2004-095103

(51) Int. Cl.
*H04N 5/228* (2006.01)
*G03B 17/00* (2006.01)

(52) U.S. Cl. .............................. 348/208.2; 348/208.12; 348/208.16; 396/52; 396/55

(58) Field of Classification Search ................................ 348/208.99–208.16, 223.1–225.1; 396/52–55
See application file for complete search history.

(56) References Cited

U.S. PATENT DOCUMENTS

| 4,780,739 A * | 10/1988 | Kawakami et al. ............ 396/54 |
| 5,666,158 A * | 9/1997 | Sekine et al. .......... 348/209.99 |
| 5,734,932 A * | 3/1998 | Washisu ...................... 396/55 |
| 5,861,916 A * | 1/1999 | Sekine et al. .......... 348/207.99 |
| 6,449,432 B1 * | 9/2002 | Uenaka ........................ 396/52 |
| 6,628,898 B2 * | 9/2003 | Endo ............................ 396/51 |
| 7,307,653 B2 * | 12/2007 | Dutta ...................... 348/208.7 |
| 2004/0179113 A1 * | 9/2004 | Suzuki .................... 348/223.1 |

FOREIGN PATENT DOCUMENTS

| JP | 6-27255 | 3/1994 |
| JP | 6-67255 | 3/1994 |

OTHER PUBLICATIONS

English Language Abstract of JP 6-27255.
English Language Abstract of JP 6-67255.

* cited by examiner

*Primary Examiner*—Sinh Tran
*Assistant Examiner*—Christopher K Peterson
(74) *Attorney, Agent, or Firm*—Greenblum & Bernstein, P.L.C.

(57) ABSTRACT

Rotations of a camera around two axes are detected by two gyro sensors. A color temperature of a photographing location is detected by an AWB sensor. One of a plurality of low-pass filters, the cut-off frequency component of which is different, can be connected to one gyro sensor. The low-pass filter which is connected to the gyro sensor, is changed by a transfer switch based on the output result of the AWB sensor, so that a frequency range which is retrieved from the output voltage of the gyro sensor is controlled. With respect to another gyro sensor, a similar operation is carried out. A hand-tremble correcting circuit calculates a driving amount of an image sensor, by which the tremble is canceled, based on the output voltages of the gyro sensors in which a predetermined frequency range was retrieved in accordance with the condition of the photographing location.

8 Claims, 4 Drawing Sheets

CAMERA PROVIDED WITH TREMBLE CORRECTING FUNCTION

BACKGROUND OF THE INVENTION

1. Field of the Invention

The present invention relates to a tremble correcting device which is provided in an optical device, such as a camera, binoculars and so on.

2. Description of the Related Art

Conventionally, some optical devices, such as cameras and binoculars, are provided with a tremble correcting function. Gyro sensors are mounted in these optical devices. In the tremble correction process, tremble data (direction and amount of tremble) for a tremble of the optical device is calculated based on the outputs of the gyro sensors.

In a digital camera, a CCD is driven so that the calculated tremble can be cancelled. In a silver salt camera or binoculars, correction optical systems are driven so that the calculated tremble can be cancelled. Consequently, an image tremble caused by hand tremble and so on, is corrected, so that a clear image or view can be obtained.

Generally, when an object is photographed by camera, the color tone is sometimes adjusted in accordance with external conditions (climate, photographing location, and so on). However, in a conventional tremble correction, these external conditions are not considered. Namely, no matter what the photographing conditions are, the driving control of the correction optical systems and the CCD is carried out based on only the output of the gyro sensors. Accordingly, the tremble correction is not accurately performed in accordance with the photographing conditions.

SUMMARY OF THE INVENTION

Therefore, an object of the present invention is to more accurately perform the tremble correction in accordance with the photographing conditions.

In accordance with an aspect of the present invention, a camera is provided with a tremble correcting function, the camera comprising: a detector that detects a tremble of a camera; a measuring device that measures a color temperature of an object; an adjusting controller that adjusts an output result of the detector based on an output of the measuring device; and a canceling controller that cancels an image tremble based on the output result of the detector which was adjusted by the adjusting controller.

Preferably, the adjusting controller retrieves signal components in a high frequency range, a middle frequency range, and a low frequency range in the predetermined frequency range, from said output result, when the output of the measuring device indicates that the photographing was carried out in fine weather. The adjusting controller retrieves signal components in the middle and low frequency ranges from the output result, when the output of the measuring device indicates that the photographing was carried out in cloudy weather. The adjusting controller retrieves signal components in the low frequency range from the output result, when the output of the measuring device indicates that the photographing was carried out indoors.

Preferably, the predetermined frequency range corresponds to a general frequency of a hand tremble. The high frequency range corresponds to a high range of in the general frequency. The middle frequency range corresponds to a middle range of the general frequency. The low frequency range corresponds to a low range of the general frequency.

For example, the detector is a gyro sensor, and the adjusting controller includes: a plurality of low-pass filters, the cut-off frequencies of which are different; and a transfer switch that changes a connection between the plurality of low-pass filters and the gyro sensor.

Optionally, the cancel controller may cancel the image tremble by driving an image sensor. Further, optionally, the camera may comprise a correcting optical system which is included in a photographing optical system, and the canceling controller may cancel the image tremble by moving the correcting optical system.

In accordance with another aspect of the present invention, there is provided a camera provided with a tremble correcting function which comprises: a detector that detects a tremble of a camera; an adjusting controller that adjusts an output result of the detector; and a canceling controller that cancels the image tremble based on the output result of the detector which was adjusted by the adjusting device. The adjusting controller retrieves a predetermined frequency range from said output result based on the range of combinations of a shutter speed and an aperture value. Preferably, the predetermined frequency range corresponds to a general frequency of a hand tremble.

As described above, according to the present invention, the tremble is cancelled after the output result of the tremble detector is adjusted based on the color temperature of the object. Accordingly, when tremble caused by a hand tremble and so on is corrected, it is possible to carry out an accurate correction which fits the photographing conditions.

BRIEF DESCRIPTION OF THE DRAWINGS

The objects of the present invention will be better understood from the following description, with reference to the accompanying drawings, in which.

DESCRIPTION OF THE PREFERRED EMBODIMENTS

Figure 1:
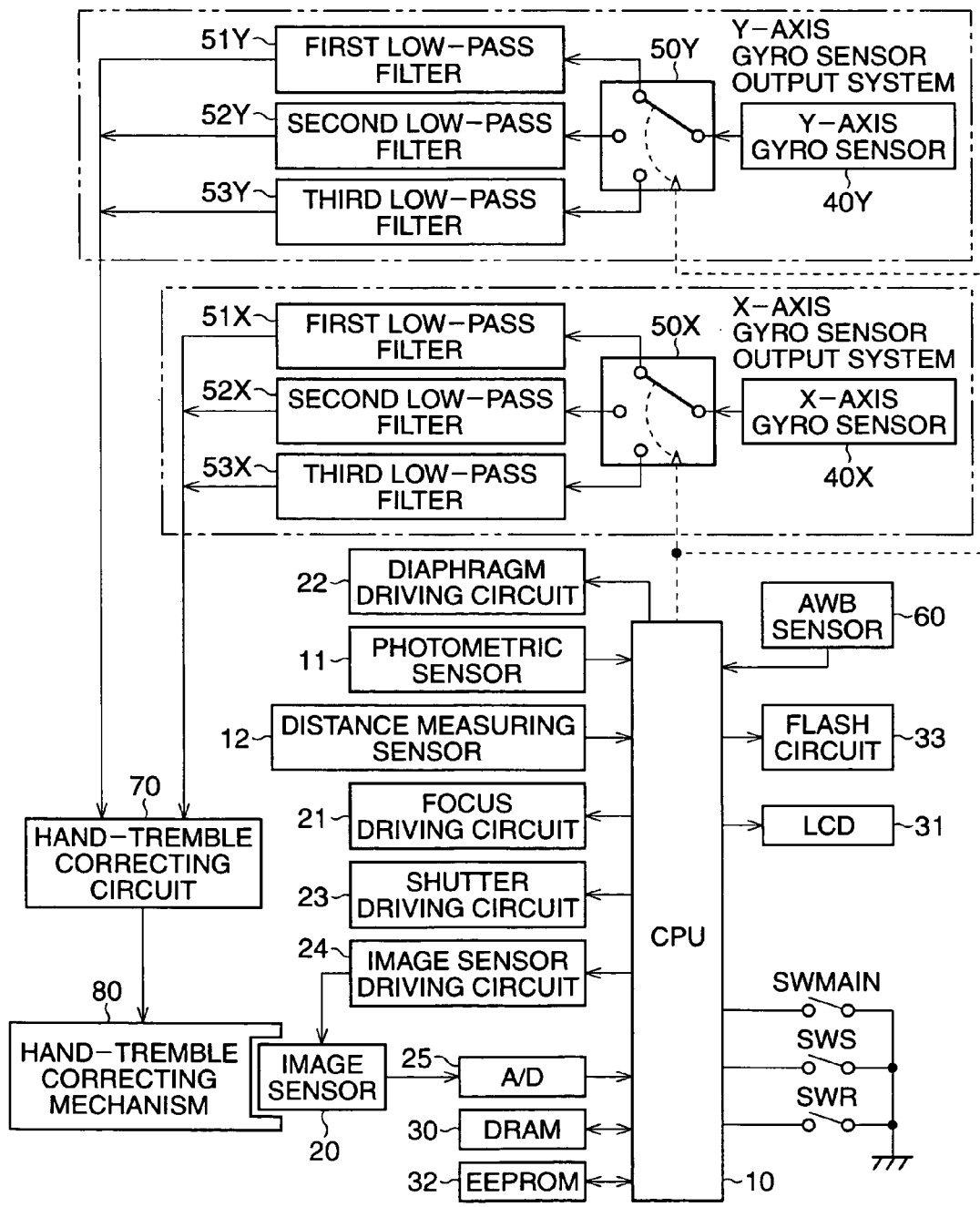
FIG. 1 is a block diaphragm of a digital camera to which an embodiment according to the present invention is applied.

The present invention will now be described with reference to an embodiment shown in the drawings.

FIG. 1 is a block diaphragm of a digital camera to which an embodiment according to the present invention is applied. A CPU 10, for example a microcomputer, wholly controls the digital camera. The status (on and off) of a power switch SWMAIN is controlled by a power button (not shown) which is provided on the case of the digital camera. When the power switch SWMAIN is turned on, electric power is supplied to the CPU 10.

A photometric switch SWS is turned on, when a shutter button (not shown) of the case is partially pressed. When the photometric switch SWS is turned on, the CPU 10 carries out photometric operations and distance measurement. Namely, an exposure value is calculated based on the input from a photometric sensor 11. Further, various values which are necessary for photographing, namely an aperture value, a shutter speed, and a charge storing period of an image sensor 20, are calculated based on the exposure value.

Further, the driving amount of a focusing lens (not shown) is calculated based on the input from the distance measuring sensor 12. The control signal is output to a focus driving circuit 21. The driving signal is output to the focusing lens from the focus driving circuit 21.

When the shutter button is fully pressed, a release switch SWR is turned on. When the release switch SWR is turned on, the driving amounts of an diaphragm driving mechanism (not shown) and a shutter (not shown) are calculated by the CPU 10, in accordance with the aperture value which is calculated in the photometric operation. Based on this calculation, a control signal is respectively output from the CPU 10 to a diaphragm driving circuit 22 and a shutter driving circuit 23.

A driving signal is output from the diaphragm driving circuit 22 to a diaphragm driving mechanism (not shown), and the diaphragm driving mechanism is driven. When the diaphragm driving mechanism is driven, the movement is transmitted to a diaphragm (not shown), and the aperture of the diaphragm is set to a predetermined value. Further, a driving signal is output from the shutter driving circuit 23 to the shutter, and the shutter is opened for a predetermined period.

After the above-mentioned controls, light which passed through a photographing optical system (not shown) is incident on a receiving plane of the image sensor 20.

Further, based on the above-mentioned charge storing period, a control signal is output to an image sensor driving circuit 24, and a driving signal is output from the circuit 24 to the image sensor 20. Photometric conversion of an image of the object which is imaged on the receiving plane, is carried out by the image sensor 20, and analog image signals are output from the image sensor 20. The analog image signals are converted to digital image signals by an A/D converting circuit 25. The digital image signals are input to the CPU 10.

The digital image signals are subjected to predetermined image operations under the control of the CPU 10. In the processes of the image operations, image data are temporally stored in a DRAM 30. After the image operations, the image data are transmitted to an LCD 31, and the image of the object is reproduced on the LCD 31.

Various programs which control the digital camera, and so on are stored in an EEPROM 32. Further, if the quantity of light for illuminating the object is not enough, a driving signal is output from the CPU 10 to a flash circuit 33, so that flash light is supplied.

An X-axis gyro sensor 40X, which is included in an X-axis gyro sensor output system, outputs a voltage which is in proportion to an angular speed of rotation of the camera around an x-axis. Note that the X-axis exists on the plane which is perpendicular to the optical axis of the digital camera. The gyro sensor 40X can be connected with a first low-pass filter 51X, a second low-pass filter 52X, and a third low-pass filter 53X, through a transfer switch 50X.

The first low-pass filter 51X cuts a frequency component which is more than 30 Hz, in the voltage output from the gyro sensor 40X. The second low-pass filter 52X cuts a frequency component which is more than 20 Hz, in the output voltage of the gyro sensor 40X. The third low-pass filter 53X cuts a frequency component which is more than 10 Hz, in the output voltage of the gyro sensor 40X. In other words, the first low-pass filter 51X retrieves signal components in a high frequency range, a middle frequency range component, and a low frequency range component, in a frequency range which is equal to or less than 30 Hz. The second low-pass filter 52X retrieves the middle and low frequency ranges in the frequency range. The third low-pass filter 53X retrieves the low frequency range in the frequency range.

Namely, frequency ranges, which are retrieved in the voltage output from the gyro sensor 40X, can be changed by controlling the transfer switch 50X.

A Y-axis gyro sensor 40Y, which is included in a Y-axis gyro sensor output system, outputs a voltage which is in proportion to an angular speed of rotation of the camera around a Y-axis. Note that the Y-axis crosses at a right angle to the X-axis which is on a plane that is perpendicular to the optical axis of the camera. The gyro sensor 40Y can be connected with a first low-pass filter 51Y, a second low-pass filter 52Y, and a third low-pass filter 53Y, through a transfer switch 50Y.

The first low-pass filter 51Y cuts a frequency component which is more than 30 Hz, in the voltage output from the gyro sensor 40Y. The second low-pass filter 52Y cuts a frequency component which is more than 20 Hz, in the output voltage of the gyro sensor 40Y. The third low-pass filter 53Y cuts a frequency component which is more than 10 Hz, in the output voltage of the gyro sensor 40Y. In other words, the first low-pass filter 51Y retrieves signal components in a high frequency range, a middle frequency range component, and a low frequency range component, in a frequency range which is equal to or less than 30 Hz. The second low-pass filter 52Y retrieves the middle and low frequency ranges in the frequency range. The third low-pass filter 53Y retrieves the low frequency range in the frequency range.

Namely, frequency ranges, which are retrieved in the voltage output from the gyro sensor 40Y, can be changed by controlling the transfer switch 50Y.

An AWB (Auto White Balance) sensor 60 is a sensor which measures a color temperature of a photographing location. The CPU 10 judges a condition of the photographing location based on the output from the AWB sensor 60. Note that, there are many conditions, for example, outdoors or indoors, fine or cloudy, under fluorescent light or under electric bulb, and so on.

Further, the CPU 10 controls the above-mentioned transfer switches 50X and 50Y in accordance with the judgment of the photographing conditions, and decides the cutoff frequency from the output voltage of the gyro sensors 40X and 40Y.

Note that, the color temperature can be measured by processing the image signals obtained from the image sensor 20. However, in this embodiment, considering the time required for measuring the color temperature, and speed of the control, the AWB sensor 60 is used alone.

The first through third low-pass filters 51X, 52X, and 53X of the X-axis gyro sensor output system, and the first through third low-pass filters 51Y, 52Y, and 53Y of the Y-axis gyro sensor output system, are connected to a hand-tremble correcting circuit 70. As described above, one of the filters 51X, 52X, and 53X is connected to the gyro sensor 40X through the transfer switch 50X, and a predetermined frequency component of the output voltage of the gyro sensor 40X is cut off by the connected filter. After that, the output voltage of the gyro sensor 40X is applied to the hand-tremble correcting circuit 70.

Similarly, one of the filters 51Y, 52Y, and 53Y is connected to the gyro sensor 40Y through the transfer switch 50Y, and a predetermined frequency component of the output voltage of the gyro sensor 40Y is cut off by the connected filter. After that, the output voltage of the gyro sensor 40Y is applied to the hand-tremble correcting circuit 70.

In the hand-tremble correcting circuit 70, the angular speeds of the rotations around the X and Y axes are integrated based on the output voltages of the gyro sensors 40X and 40Y. Consequently, movement amounts of the camera around the X and Y axes are calculated, so that tremble amounts of the camera around the X and Y axes are calculated.

Further, in the circuit 70, the image sensor 20 driving data for canceling the calculated tremble amounts, is calculated. The calculated driving data is output to a hand-tremble correcting mechanism 80. The image sensor 20 is moved along the plane perpendicular to the optical axis of the digital camera by the hand-tremble correcting mechanism 80.

Figure 2:
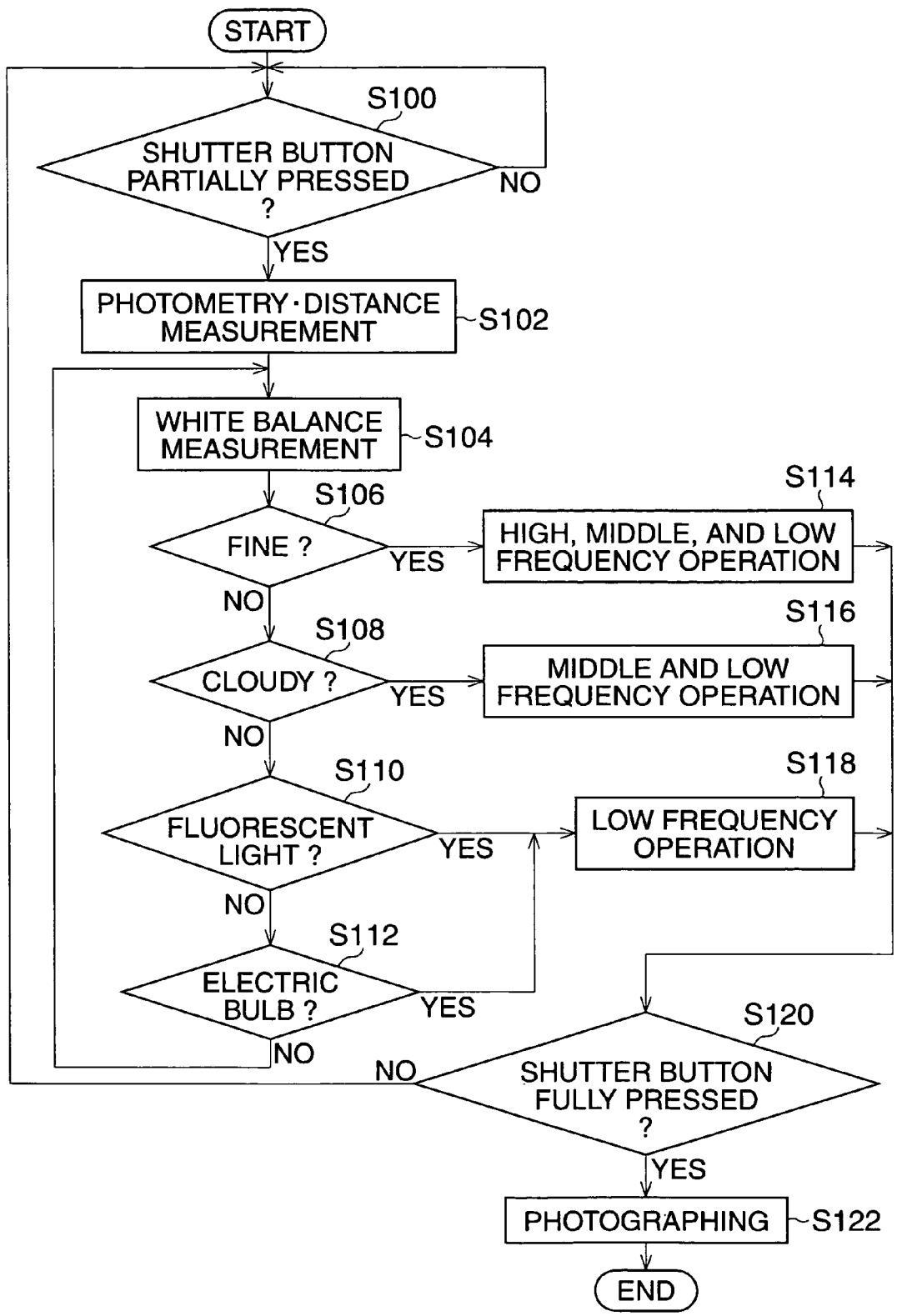
FIG. 2 is a flow-chart which shows the photographing processes.

FIG. 2 is a flow-chart which shows the photographing processes in this embodiment. In step S100, the status of the switch SWS is checked, and it is judged if the shutter button of the camera case is partially pressed. If it is judged that the shutter button is pressed partially and the switch SWS is turned on, the control goes to step S102. In step S102, the photometric operation and the distance measurement are carried out.

Next, in step S104, the color temperature of the photographing place is measured by the AWB sensor 60. In steps S106 through S112, the output of the AWB sensor 60 is checked.

If it is confirmed in step S106 that the color temperature output from the AWB sensor 60 is approximately 5500 K (kelvin) and the photographing is performed in a fine weather, the control goes to step S114. In step S114, the transfer switches 50X and 50Y are controlled so that the X-axis gyro sensor 40X is connected to the first low-pass filter 51X and the Y-axis gyro sensor 40Y is connected to the first low-pass filter 51Y. Consequently, the frequency component higher than 30 Hz is cut in the output voltages of the sensors 40X and 40Y, and only the frequency component which is equal to or less than 30 Hz is input to the hand-tremble correcting circuit 70.

If it is confirmed in step S108 that the color temperature output from the AWB sensor 60 is approximately 6000 K (kelvin) and the photographing is performed in cloudy weather, the control goes to step S116. In step S116, the transfer switches 50X and 50Y are controlled so that the X-axis gyro sensor 40X is connected to the second low-pass filter 52X and the Y-axis gyro sensor 40Y is connected to the second low-pass filter 52Y. Consequently, the frequency component higher than 20 Hz is cut in the output voltages of the sensors 40X and 40Y, and only the frequency component which is equal to or less than 20 Hz is input to the hand-tremble correcting circuit 70.

If it is confirmed in step S110 that the output of the AWB sensor 60 is out of the output range of a light source of blackbody radiation, and photographing is performed under fluorescent light, the control goes to step S118. Also, if it is confirmed in step S112 that the color temperature output from the AWB sensor 60 is approximately 3000 K (kelvin) and the photographing is performed under electric bulb, the control goes to step S118.

In step S118, the transfer switches 50X and 50Y are controlled so that the X-axis gyro sensor 40X is connected to the third low-pass filter 53X and the Y-axis gyro sensor 40Y is connected to the third low-pass filter 53Y. Consequently, the frequency component higher than 10 Hz is cut in the output voltages of the sensors 40X and 40Y, and only the frequency component which is equal to or less than 10 Hz is input to the hand-tremble correcting circuit 70.

After the cut off operation for the predetermined frequency component in the output voltage of the gyro sensors 40X and 40Y, is carried out in one of steps S114, S116, and S118, the control goes to step S120. In step S120, the status of the switch SWR is checked, and it is judged if the shutter button is fully pressed two steps. If it is confirmed that the shutter button is fully pressed and the switch SWR is turned on, the control goes to step S122. In step S122, the image sensor 20 is driven to carry out photographing of the object.

Figure 3:
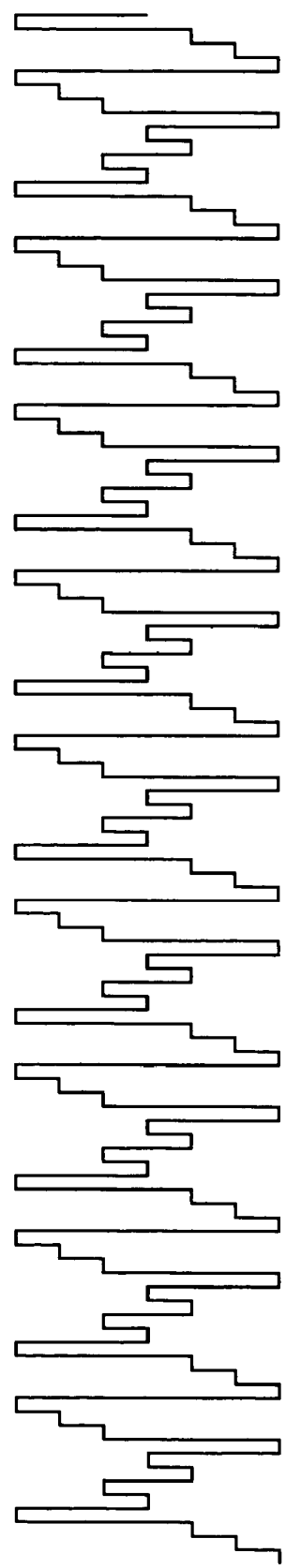
FIG. 3 is a view which shows a frequency component which is equal to or more than 30 Hz, in an output voltage of a gyro sensor, in the form of a square wave.
Figure 4:
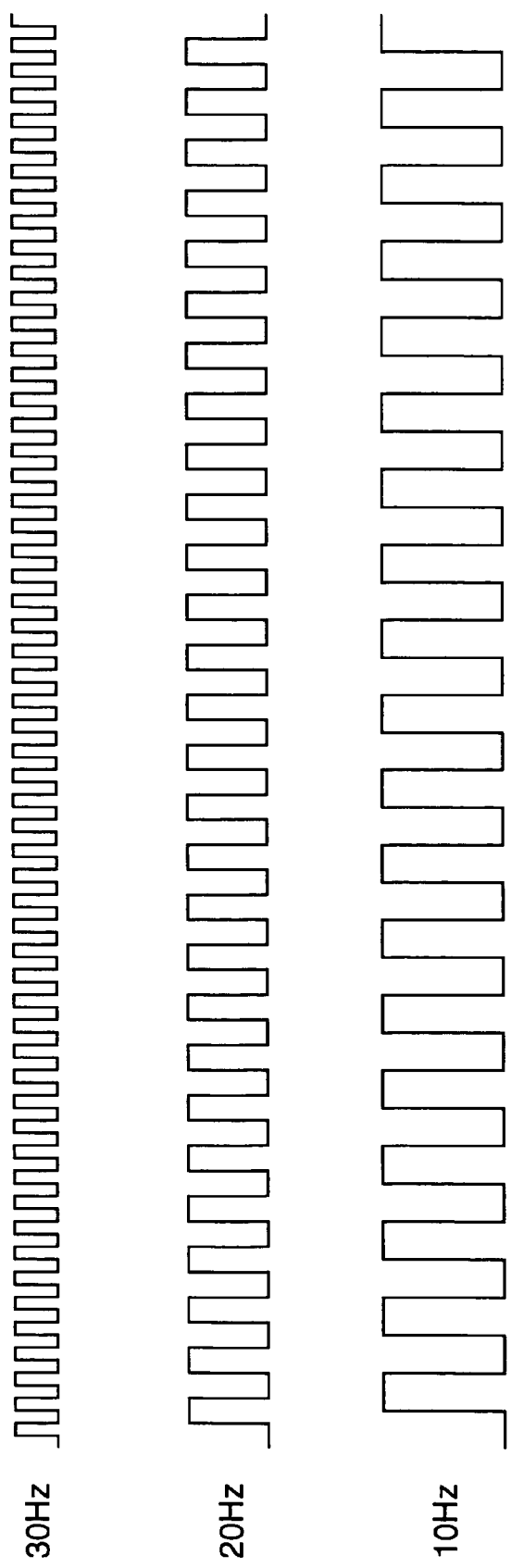
FIG. 4 is a view which shows square wave components included in the output voltage of a gyro sensor.

Generally, the frequency range for correcting the hand tremble or vibration for preventing an image tremble is 600 through 1800 times per minute. In other words, the general frequency range of the hand tremble is equal to or less than approximately 30 Hz, and the correction has to be performed corresponding to frequency components which are equal to or less than approximately 30 Hz in the output voltage of the gyro sensors 40X and 40Y. FIG. 3 shows a frequency component which is equal to or less than 30 Hz in the output voltage of the X-axis gyro sensor 40X, in the form of a square wave. The square wave of FIG. 3 includes a square wave component of 30 Hz, a square wave component of 20 Hz, and a square wave component of 10 Hz, shown in FIG. 4.

When the photographing is performed indoors or under a streetlight at night, the brightness of the object is relatively low. Accordingly, a shutter speed is to some extent slower. In other words, the variation of combinations of shutter speed and aperture value is narrow. Therefore, the correction of the hand tremble can be achieved by carrying out the correction corresponding to the low frequency component which is about 10 Hz.

On the other hand, when the photographing is performed outdoors in fine weather, the brightness of the object is relatively high. Accordingly, the variation of combination of shutter speed and aperture value is large. Therefore, the correction has to be performed corresponding to the frequency component which is equal to or less than about 30 Hz, so as to be able to handle the wide variation of combinations of shutter speed and aperture value.

Further, when the photographing is performed outdoors in cloudy weather, the brightness of the object is higher than that when indoors photographing, but lower than that when outdoors photographing in fine weather. Accordingly, the shutter speed is restrained at a low speed to some extent, however, the variation of combinations of shutter speed and aperture value is wider than that when indoors photographing and so on. Accordingly, under these photographing conditions (outdoors in cloudy weather), the correction has to be performed corresponding to the frequency component which is equal to or less than about 20 Hz.

As described above, in this embodiment, the transfer switches 50X and 50Y are controlled based on the detecting result of the AWB sensor 60, and the frequency component to be cut off the voltages from the gyro sensors 40X and 40Y to the circuit 70, is decided. Accordingly, only the frequency component which corresponds to the photographing condition is retrieved (or extracted) from the output voltages of the gyro sensors 40X and 40Y. Consequently, the correction of the hand tremble is proper for the photographing conditions, and the precision of the correction is improved.

Further, as the cut-off frequency is determined based on the output of the AWB sensor 60 in this embodiment, the determination is not affected by the brightness of the object. Accordingly, the correction of the hand tremble is performed more accurately.

Note that, in this embodiment, the hand tremble is cancelled by moving the image sensor 20, however, the manner of canceling is not restricted to this embodiment. The control of the cut-off frequency of the output voltages of the gyro sensors 40X and 40Y based on the detecting result of the AWB sensor 60 can be applied to a camera in which the hand tremble is cancelled by moving a correction optical system included in a photographing optical system.

The present disclosure relates to subject matter contained in Japanese Patent Application No. 2004-095103 (filed on Mar. 29, 2004) which is expressly incorporated herein, by reference, in its entirety.

The invention claimed is:

1. A camera provided with tremble correcting function comprising:
a gyro sensor that detects a tremble of a camera;
a measuring device that measures a color temperature of an object;
an adjusting controller that adjusts an output result of said gyro sensor based on an output of said measuring device;
a canceling controller that cancels an image tremble based on said output result of said gyro sensor which was adjusted by said adjusting controller,
wherein said adjusting controller retrieves signal components in a predetermined frequency range from said output result, based on said color temperature measured by said measuring device.

2. A camera according to claim 1, wherein:
said adjusting controller retrieves signal components in a high frequency range, a middle frequency range, and a low frequency range in said predetermined frequency range, from said output result, when said output of said measuring device indicates that the photographing was carried out in fine weather;
said adjusting controller retrieves signal components in said middle and low frequency ranges from said output result, when said output of said measuring device indicates that the photographing was carried out in cloudy weather; and
said adjusting controller retrieves signal components in said low frequency range from said output result, when said output of said measuring device indicates that the photographing was carried out indoors.

3. A camera according to claim 2, wherein:
said predetermined frequency range corresponds to a general frequency of a hand tremble,
said high frequency range corresponds to a high range of in said general frequency,
said middle frequency range corresponds to a middle range of said general frequency, and
said low frequency range corresponds to a low range of said general frequency.

4. A camera according to claim 2, wherein:
said adjusting controller includes:
a plurality of low-pass filters, the cut-off frequencies of which are different; and
a transfer switch that changes a connection between said plurality of low-pass filters and said gyro sensor.

5. A camera according to claim 1,
wherein said canceling controller cancels said image tremble by driving an image sensor.

6. A camera according to claim 1, comprising:
a correcting optical system which is included in a photographing optical system,
wherein said canceling controller cancels said image tremble by moving said correcting optical system.

7. A camera provided with tremble correcting function, comprising:
a gyro sensor that detects a tremble of a camera;
an adjusting controller that adjusts an output result of said gyro sensor; and
a canceling controller that cancels said image tremble based on said output result of said gyro sensor which was adjusted by said adjusting controller;
wherein said adjusting controller retrieves signal components in a predetermined frequency range from said output result based on a range of combinations of a shutter speed and an aperture value, and based on color temperature of an object measured by a measuring device.

8. A camera according to claim 7,
wherein said predetermined frequency range corresponds to a general frequency of a hand tremble.

* * * * *